United States Patent [19]

Hayashi et al.

[11] 4,224,792
[45] Sep. 30, 1980

[54] INTERNAL COMBUSTION ENGINE EQUIPPED WITH AN IMPROVED AIR INJECTION SYSTEM

[75] Inventors: Yoshimasa Hayashi; Shin-ichi Nagumo, both of Yokohama, Japan

[73] Assignee: Nissan Motor Company, Limited, Yokohama, Japan

[21] Appl. No.: 895,793

[22] Filed: Apr. 12, 1978

Related U.S. Application Data

[62] Division of Ser. No. 744,794, Nov. 24, 1976.

[30] Foreign Application Priority Data

Dec. 12, 1975 [JP] Japan ............................ 50-168693[U]

[51] Int. Cl.³ .............................................. F01N 3/10
[52] U.S. Cl. ................................. 60/305; 123/41.85; 123/188 GC
[58] Field of Search ............................... 60/305, 304; 123/188 GC, 41.85

[56] References Cited

U.S. PATENT DOCUMENTS

| | | | |
|---|---|---|---|
| 3,438,198 | 4/1969 | Bentele | 60/305 |
| 3,522,702 | 8/1970 | Grosseau | 60/305 |
| 3,590,579 | 7/1971 | Takahashi | 60/305 |
| 3,613,359 | 10/1971 | Posh | 60/305 |
| 3,630,021 | 12/1971 | Bishop | 60/305 |
| 3,724,218 | 4/1973 | Cole | 60/305 |
| 3,898,804 | 8/1975 | Morita | 60/901 |

FOREIGN PATENT DOCUMENTS 2034810  1/1972  Fed. Rep. of Germany ............ 60/304

*Primary Examiner*—Douglas Hart

[57] ABSTRACT

An air gallery connected to an air pump is formed in the cylinder head of an internal combustion engine. A bore is also formed in the cylinder head to communicate the air gallery with the exhaust port of the engine. Within the bore an air injection nozzle is securely inserted and projected through the wall surface of the exhaust port near the longitudinal axis of the exhaust port.

6 Claims, 5 Drawing Figures

INTERNAL COMBUSTION ENGINE EQUIPPED WITH AN IMPROVED AIR INJECTION SYSTEM

This is a division, of application Ser. No. 744,794, filed Nov. 24, 1976.

This invention relates to an internal combustion engine equipped with an exhaust gas purifying system in which the unburned noxious constituents contained in the exhaust gases of the engine are oxidized in the presence of air supplied to the purifying system.

It is the prime object of the present invention to provide an improved internal combustion engine capable of effectively reducing the emission levels of the unburned noxious constituents of the exhaust gases without damage to the engine parts.

Another object of the present invention is to provide an internal combustion engine equipped with an improved air injection system which can effectively promote the oxidation reaction of the unburned and noxious constituents in the exhaust gases of the engine without any damage of a portion of the exhaust manifold.

A further object of the present invention is to provide an internal combustion engine equipped with an improved air injection system in which an air injection nozzle is inserted into a straight extending opening or bore formed in the cylinder head to inject air near the longitudinal axis of the exhaust port of engine.

The other objects, features and advantages of the internal combustion engine according to the present invention will be more apparent from the following description with reference to the accompanying drawing, in which.

It is well known in the art that additional air is supplied to the exhaust system of internal combustion engines in order to effectively oxidize the oxidizable noxious constituents contained in the exhaust gases discharged from the engines within a reactor or an oxidation catalytic converter installed downstream of the exhaust system in the presence of the supplied additional air. This additional air is generally referred to as "secondary air".

Figure 1:
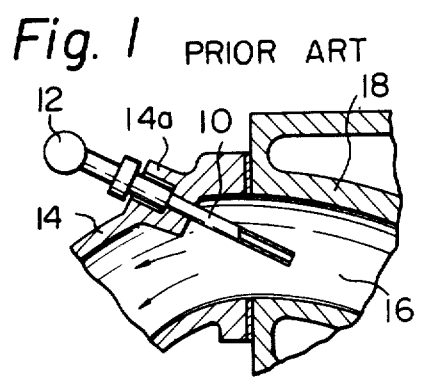
FIG. 1 is a vertical cross-section view of a portion of a prior art internal combustion engine.
Figure 2:
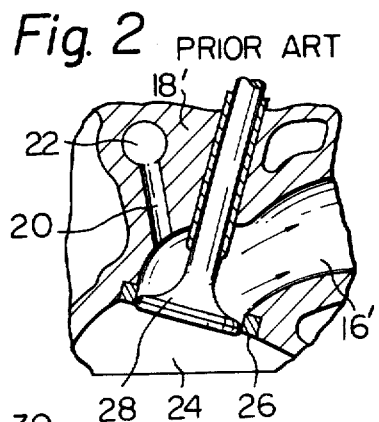
FIG. 2 is a vertical cross-section view of a portion of another prior art internal combustion engine.

From a view point of achieving an effective oxidation reaction, it is generally desirable that the secondary air is supplied or injected to the highest temperature portion of exhaust gas stream, in other words, immediately downstream of an exhaust valve in the exhaust port formed in the cylinder head of the engine. In view of the above, the secondary air is conventionally injected to high temperature exhaust gases through a secondary air injection nozzle 10 which is installed through the wall of an exhaust manifold 14 and projected into the exhaust port 16 formed in the cylinder head 18 as shown in FIG. 1, or through a secondary air injection opening 20 connecting the exhaust port 16' and a secondary air gallery 22 formed in the cylinder head 18' as shown in FIG. 2. The air gallery is connected to a secondary air source such as an air pump (not shown).

The conventional or prior art arrangements mentioned before have encountered difficulties as follows: in the arrangement in FIG. 1, a portion 14a of the exhaust manifold 14 receiving or supporting the air injection nozzle 10 is subject to damage or broken by the action of high temperature and undesirable mechanical force applied due to the vibration of an air injection manifold 12 connected to the air injection nozzle 10. The injection manifold 12 is generally of the pipe type and relatively heavy. In the arrangement in FIG. 2, exhaust gases discharged from the combustion chamber 24 are liable to enter, under pressure the secondary air injection opening 20 and accordingly insufficient secondary air is supplied to the exhaust port 16' particularly during the initial period of exhaust valve opening. Furthermore, since the secondary air is not supplied to the central portion of the exhaust gas stream in the exhaust port 16', uniform mixing of the exhaust gases and the secondary air cannot be accomplished. Additionally, the secondary air injection opening 20 is formed by machining a hole through a valve opening 26 in which an exhaust valve 28 is movable disposed and therefore the machining is considerably difficult to carry out.

In view of the above discussion, the present invention contemplates to overcome the difficulties encountered by the prior art.

Figure 3:
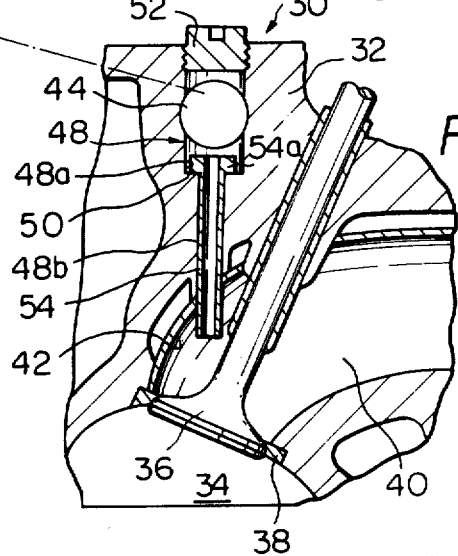
FIG. 3 is a vertical cross-section view of a portion of an internal combustion engine in accordance with the present invention.

Referring now to FIG. 3 of the drawing, a preferred embodiment of an internal combustion engine according to the present invention is shown, in which the reference numeral 30 designates a portion of the engine which comprises a cylinder head 32. The cylinder head 32, as usual, defines a combustion chamber 34 or chambers between the crown of a piston (not shown) or pistons. As shown, an exhaust valve 36 is movably seated on a valve seat 38 formed in the cylinder head surface defining the combustion chamber 34. The reference numeral 40 indicates an exhaust port communicable through the exhaust valve 36 with the combustion chamber 34 to discharge the combustion gases or exhaust gases produced in the combustion chamber 34 into the atmosphere. A liner 42 is disposed on the wall surface of the exhaust port 40 maintaining a space (no numeral) between the wall surface of the exhaust port 40 and the outer surface of the liner 42. This liner 42 functions to decrease the temperature drop of the exhaust gases passing through the exhaust port 40 by preventing exhaust gas heat transfer to the cylinder head 32.

Formed through the cylinder head 32 is an air gallery 44 (only its cross-section is shown) which extends perpendicularly with respect to the surface of the drawing, and is connected to an air source such as an air pump 46. Accordingly, the air gallery 44 is supplied with air or secondary air under pressure from the air source. A bore or a straight extending cylindrical opening 48 is formed in the cylinder head 32 to communicate the exhaust port 40 with the outside of the upper portion of the cylinder head 32. The cylindrical opening 48 includes an upper or first portion 48a and a lower portion or second portion 48b connected to each other. As seen, the upper portion 48a is larger in diameter than the lower portion and agreed with or merged into the air gallery 44 to receive the secondary air from the air gallery 44. Furthermore, the upper portion 48a is formed to open at its upper end and to provide a step portion 50 at its lower end which connects to the lower portion. The upper open end of the upper portion 48a is securely and sealingly closed by a plug 52 which is formed with a threaded portion (no numeral) engageable with the threaded portion formed on the cylindrical wall surface of the upper portion 48a. The plug 52 may be formed without the threaded portion if desired and be inserted into the upper open end of the upper portion 48a by force fit. The lower portion 48b connects to and extends from the lower end of the upper portion 48a and reaches to open to the exhaust port 40, passing through the liner 42.

Disposed in the lower portion 48b of the cylindrical opening 48 is a secondary air injection nozzle 54 or an air injection pipe which has been inserted through the upper open end of the upper portion 48a before the upper open end is closed with the plug 52 during the assembly process. The upper end of the injection nozzle 54 is formed with a cylindrical head portion 54a or flange portion which contacts the step portion 50 of the lower end of the upper portion 48a for the purpose of setting the location of the air injection nozzle 54 and of preventing the movement of same in the lower direction or in the direction of the exhaust port 40. It will be understood that the cylindrical head portion 54a of the nozzle 54 is larger in diameter than the lower portion 48b of the cylindrical opening 48 and small in diameter than the upper portion 48a of the same. As clearly shown in the figure, the lower end of the air injection nozzle 54 is projected beyond the wall surface of the exhaust port 40 and reaches near the longitudinal axis (not shown) of the exhaust port 40.

With the arrangement hereinbefore described, the secondary air admitted under pressure to the air gallery 44 is injected through the secondary air injection nozzle 54 into the exhaust gas stream near the longitudinal axis of the exhaust port 40, being heated by the heat of the cylinder head 32. Thus, the secondary air is supplied to the central portion of the high temperature exhaust gas stream and therefore the exhaust gases in the exhaust port 40 are uniformly mixed with the secondary air. Additionally, since the secondary air has been heated, the significant temperature drop of the exhaust gas stream in the exhaust port 40 does not occur. As a result, the oxidation reaction of the unburned constituents in the exhaust gases is effectively promoted. It is to be noted that since the air injection nozzle 54 is long enough project beyond the wall surface of the exhaust port 40, the exhaust gases do not enter the air injection nozzle 54 against the stream of the secondary air and therefore the secondary air supply through the air injection nozzle 54 is not prevented.

Figure 4:
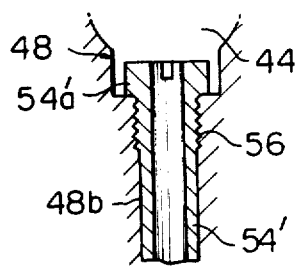
FIG. 4 is a vertical cross-section view of an example of the air injection nozzle used in the engine of FIG. 3.

FIG. 4 shows another example of the secondary air injection nozzle 54 which is formed with a screw portion 56 immediately below the head portion 54'a. The screw portion 56 is engageable with the screw portion formed on the wall surface of the lower portion 48b of the cylindrical opening 48 in order to secure the air injection nozzle 54 into the cylindrical opening 48.

Figure 5:
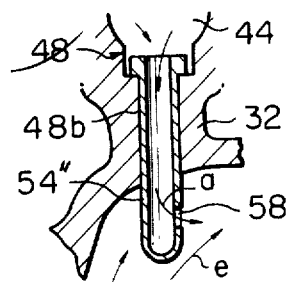
FIG. 5 is a vertical cross-section view similar to FIG. 4, but shows another example of the air injection nozzle.

FIG. 5 shows a further example of the secondary air injection nozzle 54" the lower end of which is projected into the exhaust port 40 and closed as shown. An opening 58 is formed through the cylindrical side wall of the air injection nozzle 54" such that the secondary air flowing in the air injection nozzle 54 is injected into the exhaust port 40 in the substantially same direction of the stream of exhaust gases in the exhaust port 40. In the figure, the arrow a indicates the flowing direction of the secondary air stream and the arrow e indicates that of the exhaust gas stream. With this air injection nozzle 54" thus arranged, the venturi effect created by this arrangement prevents the entry of exhaust gases into the injection nozzle 54. Additionally, secondary air flowing back into the combustion chamber 34 curing so-called valve overlap of an intake valve (not shown) and the exhaust valve 36 or a period in which both the intake and exhaust valves open can be prevented.

While only the air pump has been described as the air source 46, it will be understood that a device arranged to induct atmospheric air or the secondary air into the exhaust port near the exhaust valve by the effect of the pulsation of the exhaust gases may be used in place of the air pump.

As is apparent from the foregoing discussion, according to the present invention, mixing of the exhaust gases with the secondary air is effectively carried out, deterioration of the secondary air supply does not occur, and temperature drop of the exhaust gases passing through the exhaust port is prevented due to injection of the pre-heated secondary air. These desirable effects result in promoting the oxidation reaction of the unburned constituents contained in the exhaust gases discharged from the combustion chamber of the engine.

What is claimed is:

1. An internal combustion engine having a cylinder head defining the combustion chamber and forming therein an exhaust port communicating with the combustion chamber comprising: an exhaust valve having a valve stem, through which the combustion chamber is communicable with the exhaust port; means for defining an air gallery in the cylinder head, said air gallery being connected to an air source for supplying air under pressure into said air gallery;

means for defining a straight extending cylindrical opening connecting said air gallery and the exhaust port, and including a first portion communicating with said air gallery and openable outside of the cylinder head, and a second portion opened at one end thereof to the first portion and smaller than said first portion and openable at the other end thereof to the exhaust port; and an air injection pipe securely disposed in said straight extending cylindrical opening, said air injection pipe projecting beyond the wall surface of the exhaust port and reaching a position immediately upstream of the valve stem of said intake valve so as to inject air against said exhaust valve, said air injection pipe being provided at its first end with a cylindrical head which is larger in diameter than said second portion of said straight extending cylindrical opening and smaller in diameter than said first portion of the same, said cylindrical head of said air injection pipe being disposed in said first portion of said straight extending cylindrical opening, said air injection pipe being closed at its second end which is disposed in the exhaust port and having an air injection opening formed through the cylindrical wall thereof to communicate the inside of the air injection pipe with the exhaust port, said air injection opening being located apart from the second end thereof and so formed that air under pressure in the air injection pipe is injected into the exhaust port in the substantially same direction as of the exhaust gases discharged from the combustion chamber and flowing through the exhaust port.

2. An internal combustion engine as claimed in claim 1 in which further comprising a cylindrical plug sealingly inserted into the open end of said first portion of said straight extending cylindrical opening.

3. An internal combustion engine as claimed in claim 2, in which said cylindrical plug is formed with a threaded portion which is engageable with a threaded portion formed on the wall surface of said first portion of said straight extending cylindrical opening.

4. An internal combustion engine as claimed in claim 1, further comprising a liner disposed in the exhaust port to form an insulating space between the wall surface of the exhaust port and the outer surface of said liner.

5. An internal combustion engine as claimed in claim 1, in which said air injection pipe is so positioned that its second end resides immediately upstream and in front of the valve stem of said exhaust valve with respect to the stream of the exhaust gases discharged from the combustion chamber.

6. An internal combustion engine as claimed in claim 5, in which said air injection pipe is so positioned that the extension of its axis passes through said exhaust valve.

* * * * *